United States Patent
Townes et al.

(10) Patent No.: US 11,268,392 B2
(45) Date of Patent: Mar. 8, 2022

(54) TURBINE VANE ASSEMBLY INCORPORATING CERAMIC MATRIX COMPOSITE MATERIALS AND COOLING

(71) Applicant: Rolls-Royce plc, London (GB)

(72) Inventors: Roderick M. Townes, London (GB); Andrew T. Holt, London (GB); Michael J. Whittle, London (GB)

(73) Assignee: Rolls-Royce plc

( * ) Notice: Subject to any disclaimer, the term of this patent is extended or adjusted under 35 U.S.C. 154(b) by 92 days.

(21) Appl. No.: 16/665,638

(22) Filed: Oct. 28, 2019

(65) Prior Publication Data

US 2021/0123352 A1 Apr. 29, 2021

(51) Int. Cl.
| | |
|---|---|
| *F01D 9/04* | (2006.01) |
| *F01D 5/18* | (2006.01) |
| *F01D 5/28* | (2006.01) |
| *B33Y 10/00* | (2015.01) |

(52) U.S. Cl.
CPC .............. *F01D 9/041* (2013.01); *F01D 5/188* (2013.01); *F01D 5/284* (2013.01); *B33Y 10/00* (2014.12); *F05D 2230/31* (2013.01); *F05D 2230/60* (2013.01); *F05D 2240/126* (2013.01); *F05D 2260/201* (2013.01); *F05D 2260/22141* (2013.01); *F05D 2300/6033* (2013.01)

(58) Field of Classification Search
CPC .......... F01D 5/187; F01D 5/188; F01D 5/189; F01D 9/065
See application file for complete search history.

(56) References Cited

U.S. PATENT DOCUMENTS

| | | | |
|---|---|---|---|
| 5,232,343 A * | 8/1993 | Butts ...................... | F01D 5/187 415/115 |
| 5,340,274 A * | 8/1994 | Cunha ..................... | F02C 6/18 415/115 |
| 5,358,374 A | 10/1994 | Correia et al. | |
| 5,681,144 A | 10/1997 | Spring et al. | |
| 5,797,726 A | 8/1998 | Lee | |
| 6,183,192 B1 | 2/2001 | Tressler et al. | |
| 6,237,344 B1 | 5/2001 | Lee | |
| 6,464,456 B2 | 10/2002 | Darolia et al. | |
| 6,514,046 B1 | 2/2003 | Morrison et al. | |
| 6,652,220 B2 | 11/2003 | Powis et al. | |
| 6,709,230 B2 | 3/2004 | Morrison et al. | |

(Continued)

FOREIGN PATENT DOCUMENTS

| | | |
|---|---|---|
| EP | 1367223 A2 | 12/2003 |
| EP | 3617454 A1 | 3/2020 |

(Continued)

OTHER PUBLICATIONS

Extended European Search Report, European Application No. 20202605.0-1004, dated Mar. 9, 2021, 10pages.

*Primary Examiner* — Topaz L. Elliott

(74) *Attorney, Agent, or Firm* — Barnes & Thornburg LLP

(57) ABSTRACT

A turbine vane assembly adapted for use with a gas turbine engine includes an airfoil and a spar. The airfoil is formed to define a cavity that extends into the airfoil. The spar is located in the cavity to define a cooling passage that extends around the spar between the spar and the airfoil. The turbine vane assembly includes cooling features to aid heat transfer of the turbine vane assembly during operation in the gas turbine engine.

18 Claims, 8 Drawing Sheets

(56) References Cited

U.S. PATENT DOCUMENTS

| | | | |
|---|---|---|---|
| 7,008,185 B2 | 3/2006 | Peterman et al. | |
| 7,182,576 B2 | 2/2007 | Bunker et al. | |
| 7,435,058 B2 | 10/2008 | Campbell et al. | |
| 7,641,440 B2 | 1/2010 | Morrison et al. | |
| 8,016,547 B2 | 9/2011 | Propheter-Hinckley | |
| 8,882,448 B2 | 11/2014 | Lee | |
| 9,347,324 B2 | 5/2016 | Lee | |
| 9,486,854 B2 | 11/2016 | Propheter-Hinckley | |
| 9,527,262 B2 | 12/2016 | Zhang et al. | |
| 9,638,057 B2 | 5/2017 | Kwon | |
| 9,915,151 B2 * | 3/2018 | Weaver | F01D 9/02 |
| 9,988,913 B2 * | 6/2018 | Spangler | F01D 5/284 |
| 10,036,264 B2 | 7/2018 | McCaffrey et al. | |
| 10,240,532 B2 | 3/2019 | Scott et al. | |
| 10,408,073 B2 * | 9/2019 | Groves, II | F01D 9/065 |
| 10,934,857 B2 * | 3/2021 | Spangler | F01D 5/189 |
| 2006/0005546 A1 * | 1/2006 | Orlando | F02C 6/08 60/782 |
| 2010/0247329 A1 * | 9/2010 | Morgan | F01D 5/187 416/97 R |
| 2011/0110772 A1 | 5/2011 | Arrell et al. | |
| 2015/0198050 A1 * | 7/2015 | Lee | F01D 9/041 415/115 |
| 2016/0003053 A1 | 1/2016 | Propheter-Hinckley et al. | |
| 2016/0214907 A1 | 7/2016 | Shim et al. | |
| 2016/0348513 A1 * | 12/2016 | Weaver | F01D 5/188 |
| 2017/0030199 A1 | 2/2017 | Barker et al. | |
| 2017/0058679 A1 * | 3/2017 | Spangler | F01D 5/189 |
| 2017/0159567 A1 * | 6/2017 | Spangler | F01D 25/08 |
| 2017/0204734 A1 * | 7/2017 | Groves, II | F01D 9/065 |
| 2017/0211395 A1 | 7/2017 | Heffernan et al. | |
| 2017/0268348 A1 | 9/2017 | Lee et al. | |
| 2017/0298764 A1 | 10/2017 | Freeman et al. | |
| 2018/0045059 A1 | 2/2018 | Lee et al. | |
| 2018/0135457 A1 | 5/2018 | Propheter-Hinckley | |
| 2018/0163545 A1 | 6/2018 | Bang | |
| 2018/0216476 A1 | 8/2018 | Pardo et al. | |
| 2018/0223680 A1 | 8/2018 | Hafner | |
| 2018/0230826 A1 * | 8/2018 | Vetters | F01D 5/187 |
| 2019/0093487 A1 | 3/2019 | Marsh et al. | |
| 2019/0234236 A1 | 8/2019 | Spangler et al. | |
| 2020/0072060 A1 * | 3/2020 | Spangler | F01D 5/189 |
| 2020/0141248 A1 * | 5/2020 | Preuss | F01D 5/189 |
| 2020/0182071 A1 * | 6/2020 | Spangler | F01D 5/189 |
| 2020/0263557 A1 * | 8/2020 | Whittle | F01D 9/065 |
| 2020/0300093 A1 * | 9/2020 | Drescher | F01D 5/147 |
| 2020/0332667 A1 * | 10/2020 | Mongillo, Jr. | F01D 5/189 |
| 2020/0386103 A1 * | 12/2020 | Generale | F01D 5/189 |
| 2021/0054754 A1 * | 2/2021 | Generale | F01D 9/065 |
| 2021/0115801 A1 * | 4/2021 | Generale | F01D 9/065 |

FOREIGN PATENT DOCUMENTS

| | | | | |
|---|---|---|---|---|
| EP | 3647544 A1 | 5/2020 | | |
| EP | 3748126 A1 | 12/2020 | | |
| EP | 3783199 A1 | 2/2021 | | |
| EP | 3808942 A1 | 4/2021 | | |
| GB | 2572793 A | * | 10/2019 | F01D 5/189 |
| JP | 61118504 A | 6/1986 | | |

\* cited by examiner

TURBINE VANE ASSEMBLY INCORPORATING CERAMIC MATRIX COMPOSITE MATERIALS AND COOLING

FIELD OF THE DISCLOSURE

The present disclosure relates generally to airfoil assemblies adapted for use in gas turbine engines and more specifically to airfoil assemblies that comprise ceramic materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high-temperature resistant materials and/or to be actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength limitations of composite materials.

SUMMARY

The present disclosure may comprise one or more of the following features and combinations thereof.

According to an aspect of the present disclosure, a turbine vane assembly adapted for use with a gas turbine engine includes an airfoil, a spar, and a plurality of ribs that extend outward from the spar. The airfoil may include ceramic matrix composite materials. The airfoil may interact with hot gases flowing around the turbine vane assembly during use of the gas turbine engine. The airfoil may include an outer surface and an inner surface. The outer surface and the inner surface may be configured so that the inner surface is located opposite the outer surface to define an airfoil-shaped cavity. The airfoil-shaped cavity may extend radially entirely through the airfoil relative to an axis.

The spar may include metallic materials. The spar could be located in the airfoil-shaped cavity to receive force loads applied to the airfoil by the hot gases during use of the turbine vane assembly. The spar and the inner surface of the airfoil may cooperate to define a cooling passage that extends around the spar. The spar may include a feed duct that extends radially into the spar and a feed hole that extends through the spar. The feed hole fluidly connects the feed duct with the cooling passage which may allow cooling gas to flow from the feed duct into the cooling passage to cool the airfoil.

The spar may include a plurality of ribs that extend outwardly from the spar. The ribs may extend partway into the cooling passage toward the inner surface of the airfoil. The ribs may define cooling channels between the plurality of ribs to distribute a flow of the cooling gas and control local heat transfer between the cooling gas and the airfoil.

In some embodiments, the cooling passage may have a depth defined between the spar and the inner surface of the airfoil. The plurality of ribs may extend from the spar by a distance of between about 50 percent to about 95 percent of the depth of the cooling passage.

In some embodiments, the spar may have a leading edge and a trailing edge spaced apart axially from the leading edge relative to the axis. The plurality of ribs may extend axially and radially such that the cooling channels could converge as they extend axially from the leading edge toward the trailing edge.

In some embodiments, the plurality of ribs may form a spiral shape that wraps around the spar. The spiral might extend from a radial outer end of the spar toward a radial inner end of the spar.

In some embodiments, each rib of the plurality of ribs may extend substantially axially relative to the axis. In another embodiment, each rib of the plurality of ribs may extend substantially radially relative to the axis.

In some embodiments, turbulators may be located in the cooling channels. The turbulators may include discrete fins that extend from the spar partway into the cooling passage.

In some embodiments, the plurality of ribs may extend away from the spar by a first thickness and the turbulators may extend away from the spar by a second thickness. The first thickness may be greater than the second thickness.

In some embodiments, the spar may have a leading edge and a trailing edge spaced apart axially from the leading edge relative to the axis. The feed hole may extend through the leading edge of the spar. Additionally, the spar may include a supplemental hole that extends through the spar and is located axially between the leading edge and the trailing edge. The supplemental hole may open into one of the cooling channels.

According to another aspect of the present disclosure, a turbine vane assembly adapted for use with a gas turbine engine includes an airfoil, a spar and a rib. The airfoil may include ceramic matrix composite materials and may be configured to define a cavity that extends into the airfoil. The spar may include metallic materials and may be located in the cavity to define a cooling passage that extends around the spar. The spar may include a feed duct that extends through the spar in a first direction and a feed hole that extends through the spar in a second direction. The feed hole may fluidly connect the feed duct with the cooling passage. The spar or the airfoil also includes a rib that extends outwardly partway into the cooling passage toward the other of the spar and the airfoil.

In some embodiments, the turbine vane assembly may include an outer platform and an inner platform that are coupled with the airfoil. The inner platform may be spaced apart radially from the outer platform. The inner platform may include an exhaust passage that extends radially through the inner platform to fluidly connect the cooling passage and an inner seal chamber located radially inward of the inner platform.

In some embodiments, the spar may have a leading edge and a trailing edge spaced apart from the leading edge. The feed hole can extend through the leading edge of the spar. The spar may also include a supplemental hole that extends through the spar and may be is located axially between the leading edge and the trailing edge. The supplemental hole may open into the cooling passage.

In some embodiments, the turbine vane assembly may include a plurality of ribs that includes the rib. The plurality of ribs can be configured to define cooling channels. The plurality of ribs can be arranged such that inlets of the cooling channels at located toward the leading edge are larger than exits of the cooling channels located toward the trailing edge.

In some embodiments, the spar may include turbulators located in the cooling passage. The rib may extend away from the spar by a first thickness and the turbulators may extend away from the spar by a second thickness. The first thickness may be greater than the second thickness.

In some embodiments, the rib may form a spiral shape that wraps around the spar. The spiral-shaped rib may extend from a radial outer end of the spar toward a radial inner end of the spar.

In some embodiments, the spar can include a dam that extends radially through the feed duct to separate the feed duct into a first plenum and a second plenum. The feed hole may fluidly connect the first plenum and the cooling passage. The second plenum may only have an inlet and an exit through the radial ends of the spar, such that the second plenum is not in fluid communication with the cooling passage.

In other embodiments, the cooling passage may have a depth defined between the spar and the airfoil. The rib may extend from the spar a distance of between about 50 percent to about 95 percent of the d of the cooling passage.

According to another aspect of the present disclosure, a method may include a number of steps. The method may include providing a metallic spar and a ceramic matrix composite airfoil. The ceramic matrix composite airfoil may have an outer surface and an inner surface that defines an airfoil-shaped cavity. The airfoil-shaped cavity may extend through the ceramic matrix composite airfoil. The method may include measuring the ceramic matrix composite airfoil to obtain dimension measurements of the inner surface of the ceramic matrix composite airfoil, forming a plurality of ribs on the spar that extend outwardly away from the spar based on the dimension measurements, and locating the spar and the plurality of ribs in the airfoil-shaped cavity such that each of the plurality of ribs is spaced apart from the inner surface of the ceramic matrix composite airfoil. In some embodiments the method step of forming the plurality of ribs may include using additive layer manufacturing to build up layers of metal on the spar.

These and other features of the present disclosure will become more apparent from the following description of the illustrative embodiments.

DETAILED DESCRIPTION OF THE DRAWINGS

Figure 1:
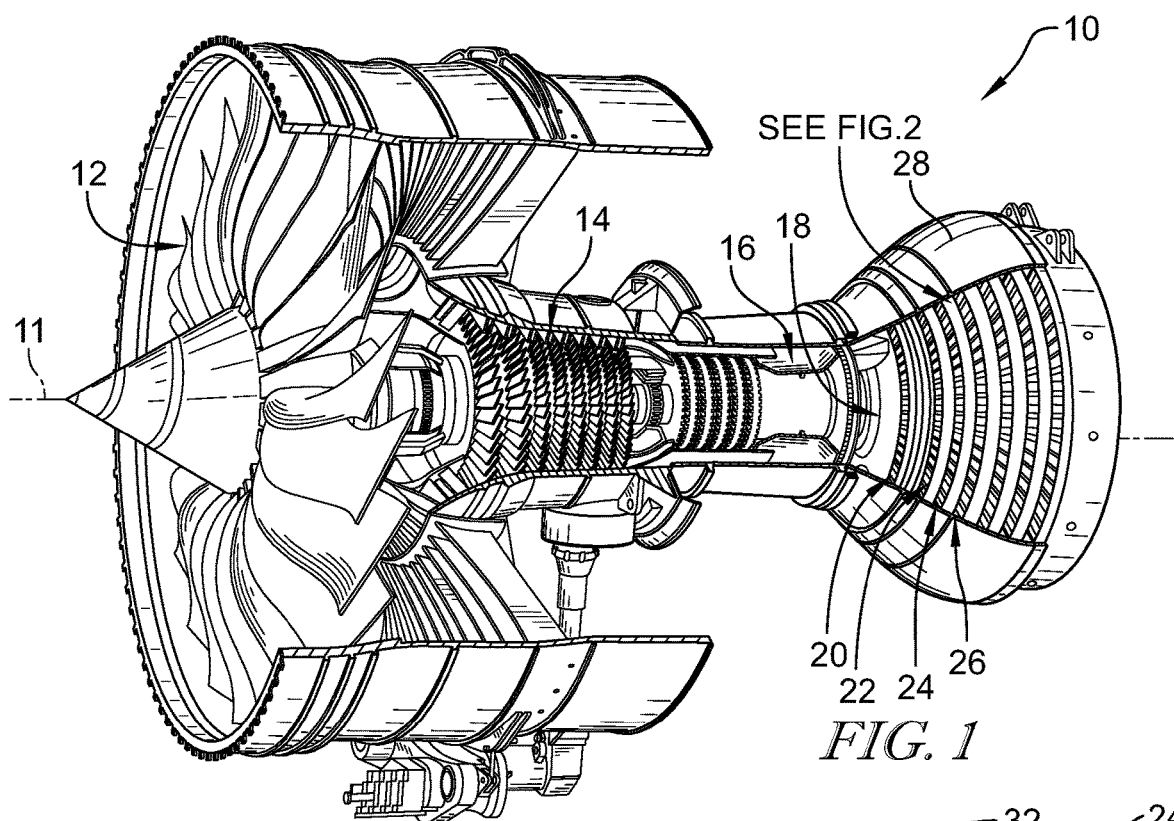
FIG. 1 is a cut-away perspective view of a gas turbine engine showing that the exemplary engine includes a fan driven by an engine core having a compressor, a combustor, and a turbine that includes a number of static vane assemblies and rotating turbine wheel assemblies.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan 12 may be replaced with a propeller, drive shaft, or other suitable configuration.

The turbine 18 includes a plurality of static turbine vane assemblies 20, 24 and a plurality of rotating turbine rotor assemblies 22, 26 as suggested in FIG. 1. The structural configurations of the turbine vane assemblies 20, 24 may be substantially similar. The turbine vane assembly 20 and the second stage turbine vane assembly 24 are coupled to an outer case 28 of the gas turbine engine 10 as shown in FIG. 5.

Figure 5:
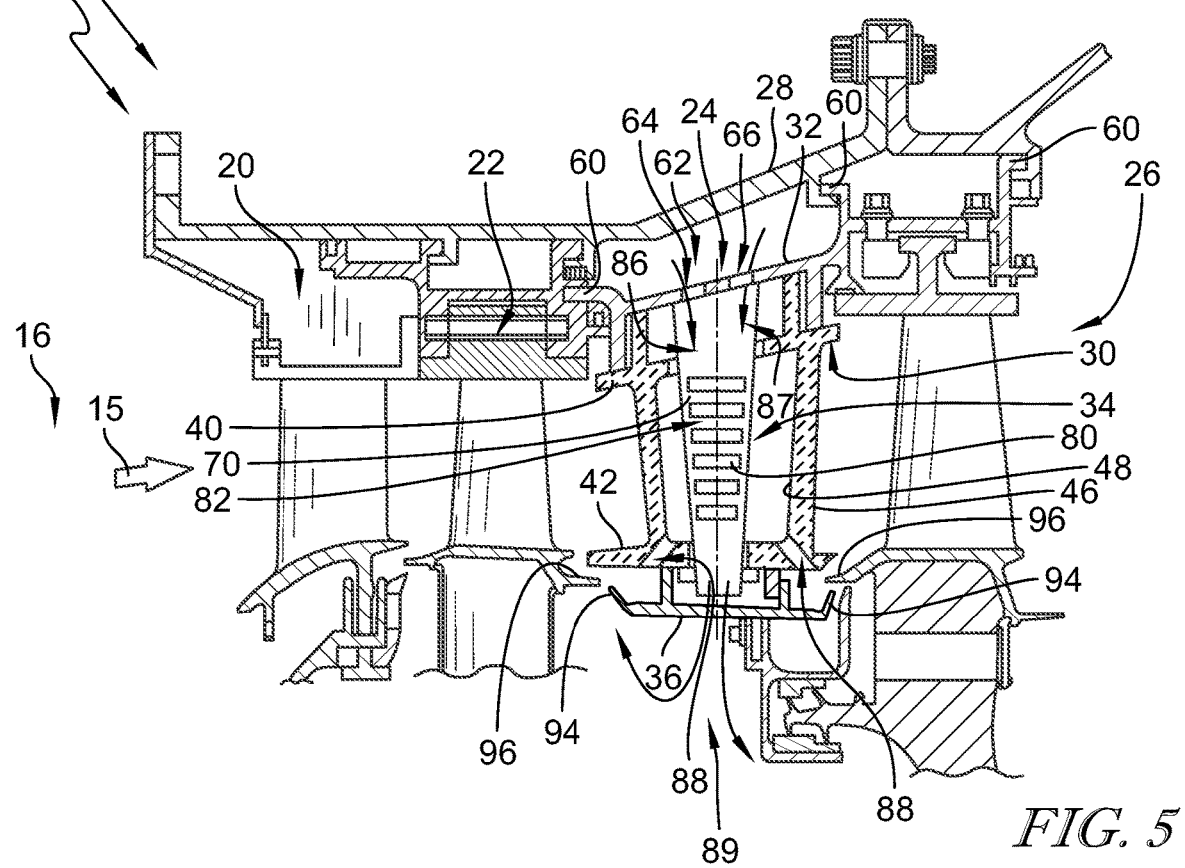
FIG. 5 is a cross-section view of a portion of the gas turbine engine of FIG. 1 showing that a cooling fluid may be supplied to the turbine vane assembly through the outer band radially inboard through a feed duct of the spar and passed into a turbine cavity located radially inward of the turbine vane assembly, where the cooling fluid may be used to seal gaps formed between the inner seal component and adjacent turbine assemblies.

The hot, high pressure combustion products from the combustor 16 are directed toward the turbine vane assembly 20 along a gas path 15 as suggested in FIG. 5. The combustion products are turned circumferentially in the gas path 15 by the vane assembly 20 which in turn pushes the turbine rotor assembly 22 to drive the rotating components of the compressor 14 and/or the fan 12. The combustion products at the exit of the turbine rotor assembly 22 continue along the gas path 15 and are turned once more by the second stage turbine vane assembly 24, which in turn pushes the second stage turbine rotor assembly 26 to provide additional drive to the rotating components of the compressor 14 and/or fan 12.

Figure 2:
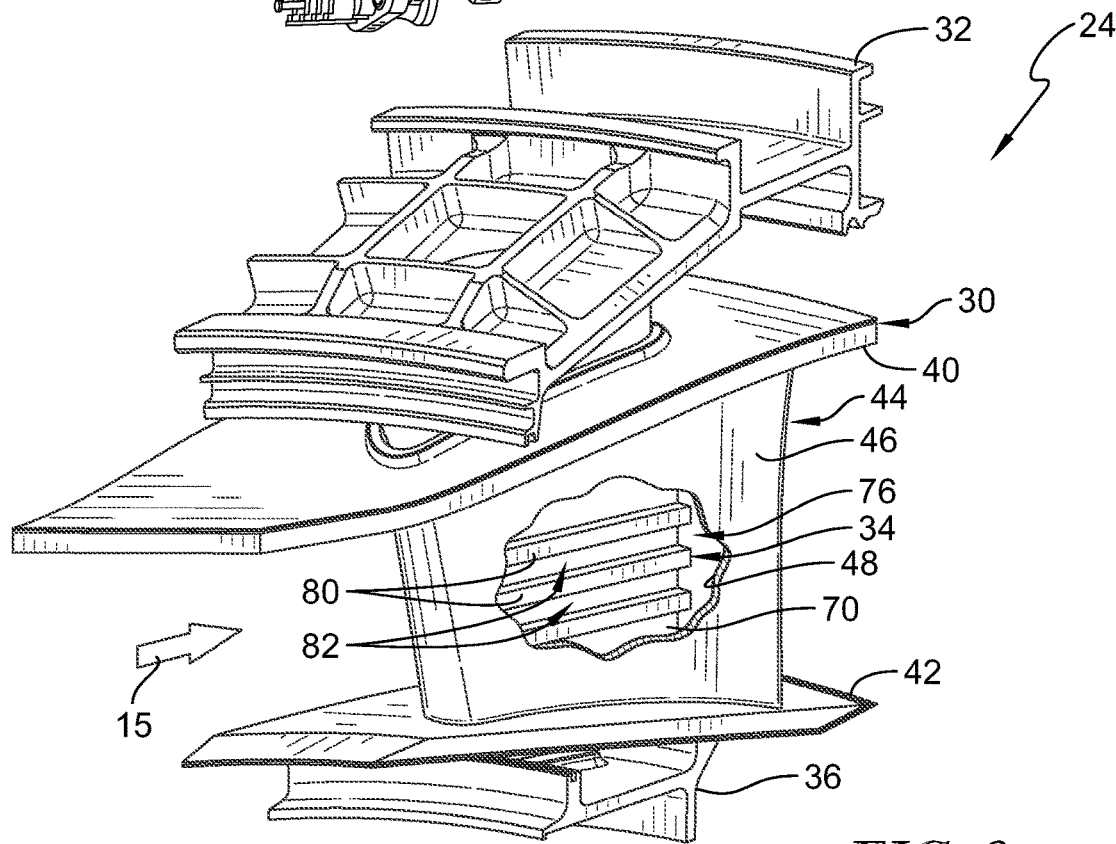
FIG. 2 is a turbine static vane assembly of the turbine included in the gas turbine engine of FIG. 1 showing the turbine vane assembly includes a vane and a spar, the vane having an outer platform, an inner platform, and a ceramic matrix composite airfoil positioned between the outer platform and the inner platform, and a cut-away portion of the airfoil showing the spar extends through a cavity of the vane and the spar having a plurality of ribs that extend from the spar toward an inner wall of the airfoil to direct the flow of cooling air in a cooling cavity between the vane and the spar and enhance heat transfer therebetween.
Figure 3:
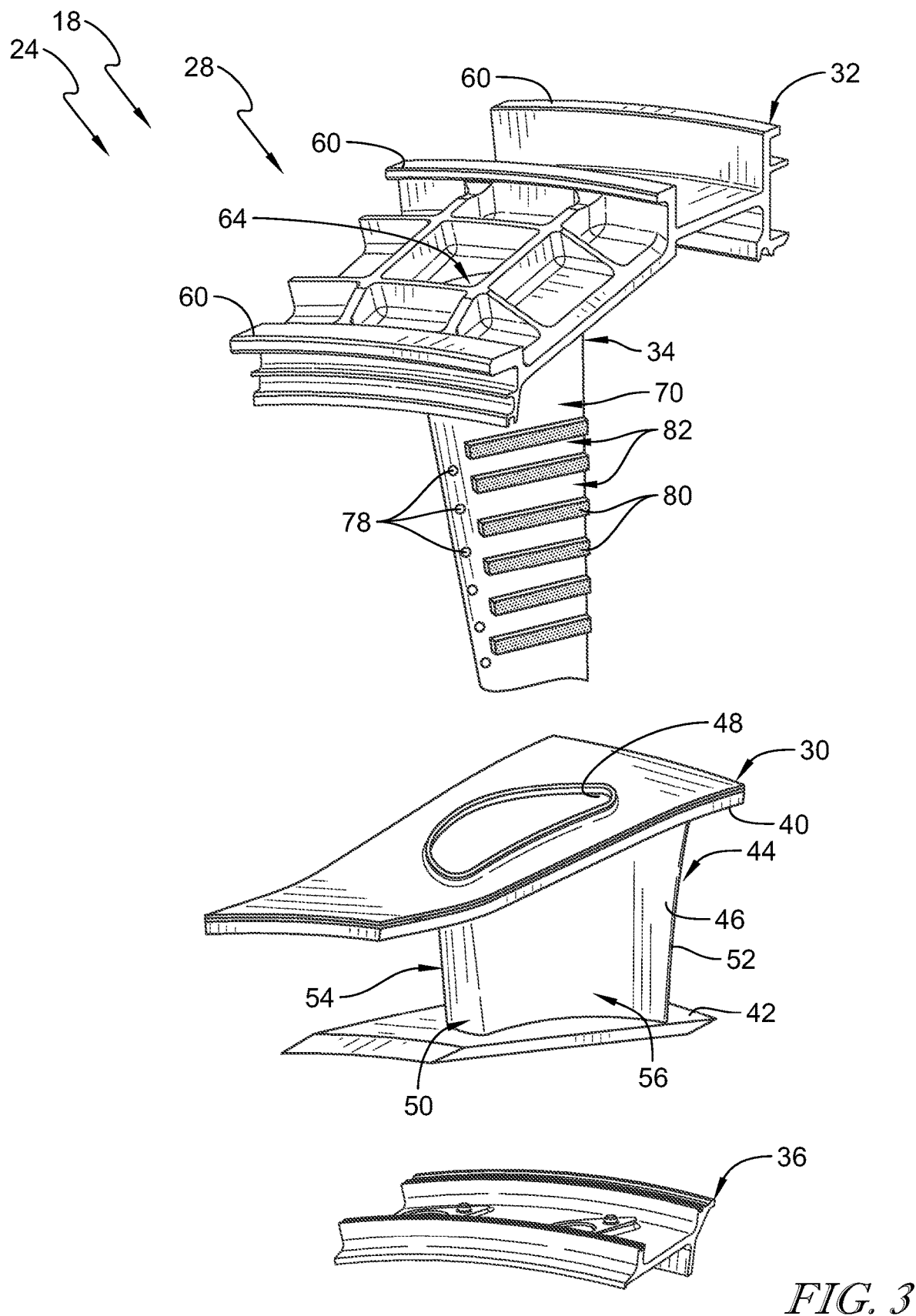
FIG. 3 is an exploded perspective view of the turbine vane assembly of FIG. 2 showing that the metallic spar extends radially inward from an outer band that may be coupled to a case of the gas turbine engine and the plurality of ribs, shaded with a stencil pattern so emphasize and contrast the surface of the ribs from the surface of the spar, are spaced apart radially from one another along the radial length of the spar.

The turbine vane assembly 24 includes a vane 30, an outer band 32 and a metallic spar 34 that are connected together, and an inner seal plate 36 that is radially inward of the vane 30 as shown in FIGS. 2 and 3. The outer band 32 and the spar 34 are assembled so that the outer band 32 is radially outboard of the vane 30 and the spar 34 extends radially through the vane 30. The inner seal plate 36 is coupled to a radially inner end of the spar 34, after the spar 34 is assembled through the vane 30.

The vane 30 comprises ceramic matrix composite materials, while the outer band 32 and spar 34 include metallic materials in the illustrative embodiment. The ceramic matrix composite materials of the vane 30 may be adapted to withstand high temperatures, but may have a relatively low strength compared to the metallic materials of the spar 34. The spar 34 provides structural strength to the assembly 10 receiving force loads applied to the vane 30 and transferring the loads out through other components of the engine such the case 28. However, the metallic spar 34 may not be capable of withstanding the high temperatures experienced by the ceramic matrix composite vane 30.

Figure 4:
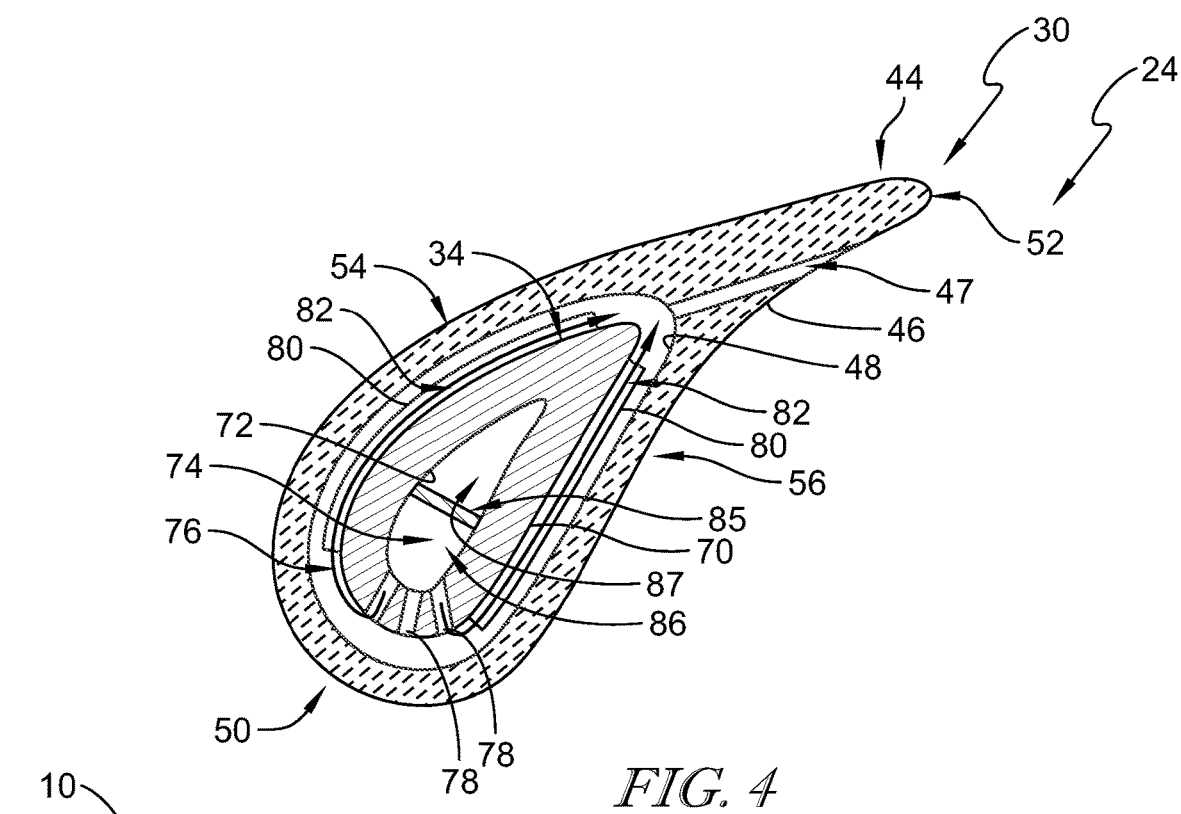
FIG. 4 is a cross-section view of the turbine vane assembly of FIG. 2 showing the spar arranged in the cavity of the vane to create the cooling cavity between an inner wall of the airfoil and an outer surface of the spar, and further showing the plurality of ribs extend from the outer surface of the spar toward the inner surface of the airfoil and along the outer surface of the spar from a leading edge to a trailing edge of the spar on both a pressure side and a suction side of the spar.

As such, the spar 34 may be shaped to include a plurality of cooling ribs 80 that are spaced apart radially along the radial length of the spar 34 to define cooling channels 82 between the plurality of ribs 80 as shown in FIGS. 3 and 4. The ribs 80 and channels 82 are configured to distribute a flow of the cooling gas and control local heat transfer between the cooling gas and the vane 30. Surfaces of the ribs 80 and other embodiments of ribs 280, 380, 480, 580, 680, 780 are shaded in the figures with a stencil pattern to contrast the surface of the ribs from the outer surface of the spar and emphasize that that the rib surfaces are spaced apart from the outer surface of the spar.

The vane 30 includes an outer platform 40, an inner platform 42, and a ceramic matrix composite airfoil 44 as shown in FIG. 3. The ceramic matrix composite airfoil 44 is located radially outward of the inner platform 42, and radially inward of the outer platform 40 so that it sits therebetween. The outer platform 40 and the inner platform 42 form a boundary for the gas path 15 and force the hot gases to interact with the ceramic matrix composite airfoil 44.

The ceramic matrix composite airfoil 44 includes an airfoil outer surface 46, an airfoil inner surface 48, a leading edge 50, a trailing edge 52, a suction side 54, and a pressure side 56 as shown in FIG. 4. The airfoil outer surface 46 interacts with the hot gases in the gas path 15. The airfoil inner surface 48 creates a hollow cavity inside the ceramic matrix composite airfoil 44 that the spar 34 extends radially through.

The leading edge 50 of the airfoil 44 is positioned axially forward of the trailing edge 52 as shown in FIG. 4. The suction side 54 is positioned between the leading edge 50 and the trailing edge 52 and experiences a pulling force by the hot gases that pass over the suction side 54. The pressure side 56 is between the leading edge 50 and the trailing edge 52 and positioned circumferentially adjacent to the suction side 54 on the ceramic matric composite airfoil 44 so that it experiences a pushing force from the hot gases of the gas path 15. The ceramic matrix composite airfoil 44 includes a cooling air exit hole 47 at the trailing edge 52 that extends between the airfoil inner surface 48 and the airfoil outer surface 46 and opens into the cooling passage 76.

The spar 34 is located inside the ceramic matrix composite airfoil 44 of the turbine vane assembly 24 as shown in FIGS. 2 and 4. The spar 34 includes a spar outer surface 70 and a spar inner surface 72 and extends radially from the outer band 32, through the vane 30, to the inner seal plate 36. The spar outer surface 70 and the airfoil inner surface 48 create a cooling passage cavity 76 therebetween which extends radially from the inner platform 42 to the outer platform 40. The spar inner surface 72 creates a feed duct 74 that transfers cooling air through the turbine vane assembly 24.

The outer band 32 includes hangers 60 that engage with the turbine outer case 28 to position the turbine vane assembly 24 in the turbine 18 as shown in FIG. 3. The outer band 32 and the turbine outer case 28 create a cavity 62 filled with cooling air provided by a different section of the gas turbine engine 10. The spar 34 extends radially inward from the outer band 32 so that the spar feed duct 74 is in fluid connection with the cavity 62 via a cooling air feed hole 64 in the outer band 32. The cooling air feed hole 64 allows cooling air from the cavity 62 to enter the feed duct 74 of the spar 34 and flow therethrough.

The spar 34 includes an array of leading edge cooling holes 78 that extend from the spar inner surface 72 to the spar outer surface 70 as shown in FIGS. 3 and 4. The leading edge cooling holes 78 fluidly connect the feed duct 74 to the cooling passage cavity 76. The leading edge cooling holes 78 may be spaced apart radially along the spar 34 depending on where cooling may be desired. The leading edge cooling holes 78 may be positioned to impinge cooling air on the airfoil inner surface 48 in desired areas, or positioned to ensure adequate cooling air may reach all parts of the turbine vane assembly.

The spar outer surface 70 of the spar 34 includes the plurality of cooling ribs 80 as shown in FIGS. 2 and 3. The cooling ribs 80 extend from the spar outer surface 70 partway towards the airfoil inner surface 48 in the cooling passage cavity 76. The cooling ribs 80 may be positioned at multiple radial locations along the spar outer surface 70 and extend axially along the suction side 54 and the pressure side 56, between the leading edge 50 and the trailing edge 52.

In some embodiments, the cooling ribs 80 extend a desired distance into the cooling passage cavity 76 as shown in FIG. 4. The cooling ribs 80 extend partway into the cooling passage cavity 76. Illustratively, the ribs 80 extend from the spar 34 toward the airfoil 44 and do not contact the inner surface 48 of the airfoil 44. In other embodiments, the ribs 80 extend from the inner surface 48 of the airfoil 44 toward the spar 34 and do not contact the spar 34. In some embodiments, the ribs 80 extend between and contact both of the spar 34 and the inner surface 48. The desired distance may be between about fifty percent and about ninety-five percent of the distance between the spar outer surface 70 and the airfoil inner surface 48.

In some embodiments, the distance may be between about one percent and about ninety-nine percent of the depth of the cooling passage 76. In some embodiments, the distance may be between about ten percent and about ninety-five percent of the depth of the cooling passage 76. In some embodiments, the distance may be between about twenty percent and about ninety-five percent of the depth of the cooling passage 76. In some embodiments, the distance may be between about twenty percent and about eighty percent of the depth of the cooling passage 76. In some embodiments, the distance may be between about twenty percent and about seventy-five percent of the depth of the cooling passage 76. In some embodiments, the distance may be between about twenty percent and about seventy percent of the depth of the cooling passage 76. In some embodiments, the distance may be between about thirty percent and about seventy-five percent of the depth of the cooling passage 76.

In some embodiments, the distance may be between about forty percent and about ninety percent of the depth of the cooling passage 76. In some embodiments, the distance may be between about forty percent and about seventy-five percent of the depth of the cooling passage 76. In some embodiments, the distance may be between about fifty percent and about seventy-five percent of the depth of the cooling passage 76. In some embodiments, the distance may be between about sixty percent and about eighty percent of the depth of the cooling passage 76. In some embodiments, the distance may be between about fifty percent and about ninety-nine percent of the depth of the cooling passage 76. In some embodiments, the distance may be between about forty percent and about ninety-nine percent of the depth of the cooling passage 76.

In some embodiments, the positional configuration of the cooling ribs 80 may be used to direct cooling flow within the cooling passage cavity 76 at different radial and axial locations around the ceramic matrix composite airfoil 44. In the illustrative embodiment of FIG. 3, the ribs 80 extend substantially axially.

In some embodiments, cooling channels 82 are created between two radially adjacent cooling ribs 80 and encourage cooling air to flow therebetween. In the illustrative embodiment, the cooling ribs 80 are horizontal and channel cooling air from the leading edge 50 toward the trailing edge 52 around the cooling passage cavity 76 as shown in FIGS. 2 and 3. The cooling channels 82 are fed with cooling air from the leading edge cooling holes 78 and flow is directed rearward as the cooling air exits at the cooling air exit holes 47 at the trailing edge 52.

In some embodiments, the feed duct 74 includes a feed duct dam 85 positioned to split the feed duct 74 into two discrete plenums. In the illustrative embodiment as shown in FIG. 4, the feed duct dam 85 splits the feed duct 74 into a forward plenum 86, and an aft plenum 87. The cooling air feed hole 64 in the outer band 32 may be configured to feed the forward plenum 86, and a second cooling air feed hole 66 included in the outer band 32 may be configured to feed the aft plenum 87 as shown in FIG. 5.

In some embodiments, this feed duct configuration allows the forward plenum 86 to provide cooling air to the leading edge cooling holes 78 which feed the cooling passage cavity 76 and cooling channels 82. The aft plenum 87 may be configured to be fluidly connected to the inner seal cavity 89, and a different pressure of cooling air may be provided through the aft plenum 87. The pressure of cooling air in the aft plenum 87 may be regulated through sizing the second cooling air feed hole 66, adding a restrictor plate inside the aft plenum 87, or reducing the area of the aft plenum at a discrete radial position in the aft plenum 87. Other means of regulating pressure in a fluid passage may also be used in the aft plenum 87.

In the illustrative embodiments, the inner seal plate 36 provides sealing geometry with the adjacent turbine rotor assemblies 22, 26. The inner seal plate 36 functions by discouraging hot gases of the gas path 15 from entering the inner seal cavity 89 using seal fins 94 in close proximity to rotating seal fins 96 of the turbine rotor assemblies 22, 26, as well as cooling air that has passed through the turbine vane assembly 24.

The cooling air arrives in the inner seal cavity from the feed duct 74 or the inner platform exhaust passages 88 as shown in FIG. 5. The inner platform exhaust passages fluidly connect the cooling passage cavity 76 at the radially inner end of the turbine vane assembly 24 with the inner seal cavity 89.

The cooling ribs 80 are designed onto the spar outer surface 70 in a shape defined to distribute the flow and control local heat transfer effect. The cooling ribs 80 may be formed as part of the spar 34 for example cast or additively layer manufactured on the external surface during manufacture of the spar 34. In other embodiments, the cooling ribs 80 may be fabricated for example by welding, brazing or additively layer manufactured onto an existing spar 34.

Figure 6:
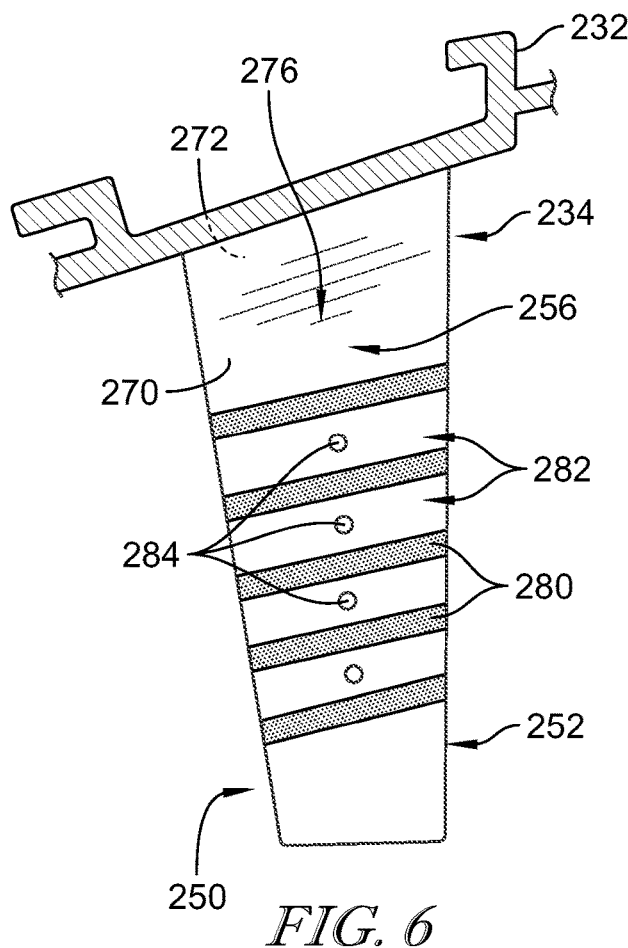
FIG. 6 is a detailed view of another embodiment of a spar adapted for use in the turbine vane assembly of FIG. 2 showing the spar having a plurality of ribs that extend from a leading edge of the spar to a trailing edge of the spar and positioned radially apart from each other along the radial length of the spar to create cooling passages along the spar, and further showing the spar including supplemental cooling holes that connect the feed duct to the outer surface of the spar.

Another embodiment of a spar 234 in accordance with the present disclosure is shown in FIG. 6. The spar 234 is substantially similar to the spar 34 shown in FIGS. 1-5 and described herein. Accordingly, similar reference numbers in the 200 series indicate features that are common between the spar 234 and the spar 34. The description of the spar 34 is incorporated by reference to apply to the spar 234, except in instances when it conflicts with the specific description and the drawings of the spar 234.

In the second embodiment of the spar 234, an additional array of supplemental cooling holes 284 are arranged in cooling channels 282 partway along a pressure side 256 between a leading edge 250 and a trailing edge 252 of the spar 234 as shown in FIG. 6. The supplemental cooling holes 284 extend between a spar inner surface 272 and a spar outer surface 270 and provide additional cooling air to a cooling passage cavity 276. The leading edge cooling holes are omitted in the illustrative embodiment; however, they may be kept in addition to the supplemental cooling holes 284. The spar 234 extends radially inward from an outer band 232.

Figure 7:
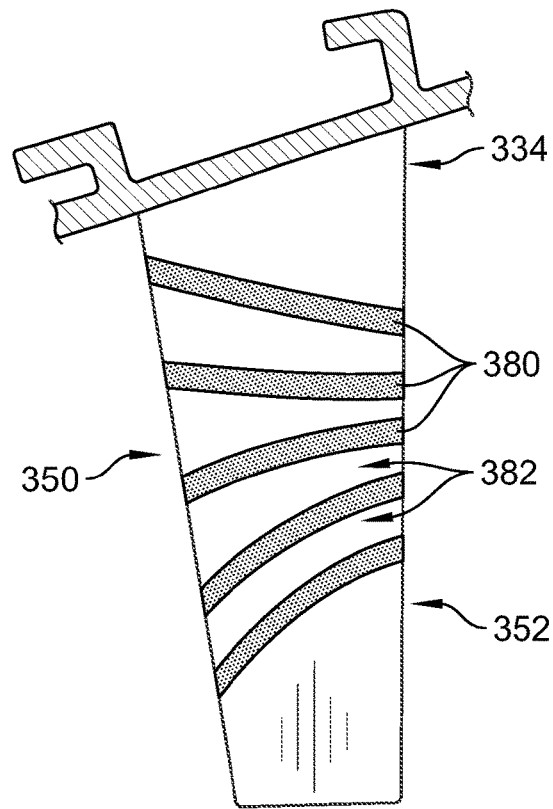
FIG. 7 is a detailed view of another embodiment of a spar adapted for use in the turbine vane assembly of FIG. 2 showing the spar having a plurality of ribs that converge radially as the ribs extend from a leading edge of the spar to a trailing edge of the spar so that the ribs conduct the cooling air to target a specific location of the ceramic matrix composite airfoil.

Another embodiment of a spar 334 in accordance with the present disclosure is shown in FIG. 7. The spar 334 is substantially similar to the spar 34 shown in FIGS. 1-5 and described herein. Accordingly, similar reference numbers in the 300 series indicate features that are common between the spar 334 and the spar 34. The description of the spar 34 is incorporated by reference to apply to the spar 334, except in instances when it conflicts with the specific description and the drawings of the spar 334.

In this embodiment, the spar 334 includes an arrangement of the cooling ribs 380 that create converging cooling channels 382 as shown in FIG. 7. The cooling ribs 380 converge radially as the cooling ribs 380 extend from a leading edge 350 to a trailing edge 352, thus the radial height of the cooling channel 382 at the leading edge 350 is larger than the radial height of the cooling channel 382 at the trailing edge 352. In this configuration the cooling channels 382 may direct cooling air to a desired region of a ceramic matrix composite vane surrounding the spar 334, which changes the velocity and pressure of the fluid and therefore improves local heat transfer in the targeted area of the airfoil.

Figure 8:
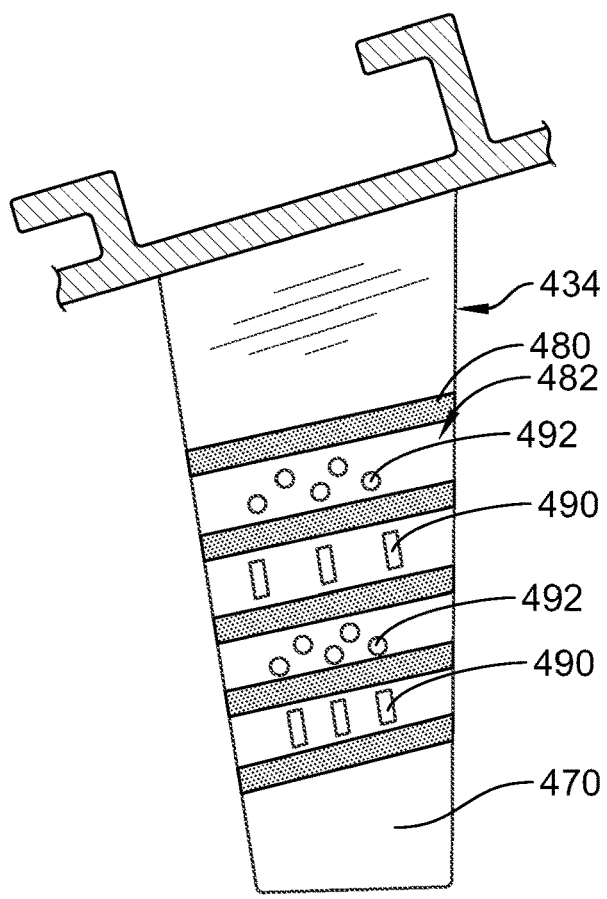
FIG. 8 is a detailed view of another embodiment of a spar adapted for use in the turbine vane assembly of FIG. 2 showing the spar having a plurality of ribs that extend from a leading edge of the spar to a trailing edge of the spar and positioned radially apart from each other along the radial length of the spar to create cooling passages along the spar and additional turbulators located between radially adjacent ribs in the cooling passages.
Figure 9:
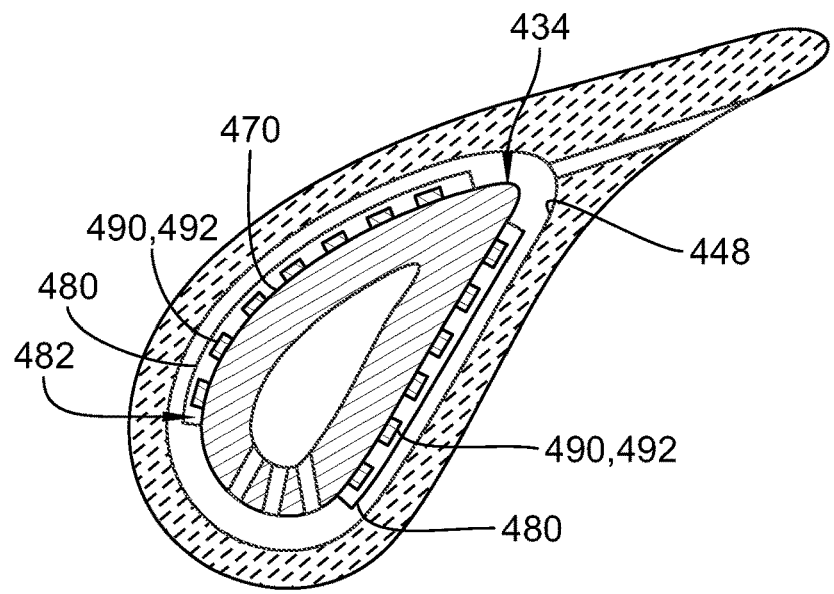
FIG. 9 is a cross-section view of a turbine vane assembly with the spar of FIG. 8 showing the turbulators extend a first distance outward from the spar into the cooling cavity and the ribs extend a second distance outward from the spar in the cooling cavity in a plurality of axial positions along the pressure side and suction side of the assembly.

Another embodiment of a spar 434 in accordance with the present disclosure is shown in FIGS. 8 and 9. The spar 434 is substantially similar to the spar 34 shown in FIGS. 1-5 and described herein. Accordingly, similar reference numbers in the 400 series indicate features that are common between the spar 434 and the spar 34. The description of the spar 34 is incorporated by reference to apply to the spar 434, except in instances when it conflicts with the specific description and the drawings of the spar 434.

The spar 434 includes a plurality of turbulators 490 and/or discrete fins 492 that extend from a spar outer surface 470 and are located in cooling channels 482 as shown in FIGS. 8 and 9. The turbulators 490 and discrete fins 492 provide a large surface area for the spar outer surface 470 and create additional turbulence of the cooling flow in the cooling channels 482 which benefits heat transfer.

Each cooling channel 482 may contain only turbulators 490, only discrete fins 492, or a combination of turbulators 490 and discrete fins 492. In other embodiments some cooling channels 482 may not contain turbulators 490 or discrete fins 492, and other cooling channels 482 of the same spar 434 may contain turbulators 490 and/or discrete fins 492.

The turbulators 490 and the discrete fins 492 may extend from the spar outer surface 470, towards an airfoil inner surface 448 as shown in FIG. 9. The turbulators 490 and the discrete fins 492 may extend the same distance from the spar outer surface 470 as the cooling ribs 480. In the illustrative embodiment in FIG. 9, the turbulators 490 and discrete fins 492 extend a different distance from the spar outer surface 470 toward to the airfoil inner surface 448 than the cooling ribs 480. The turbulators 490 and/or fins 492 extend outward a first distance and the ribs 480 extend a second distance that is greater than the first distance.

Figure 10:
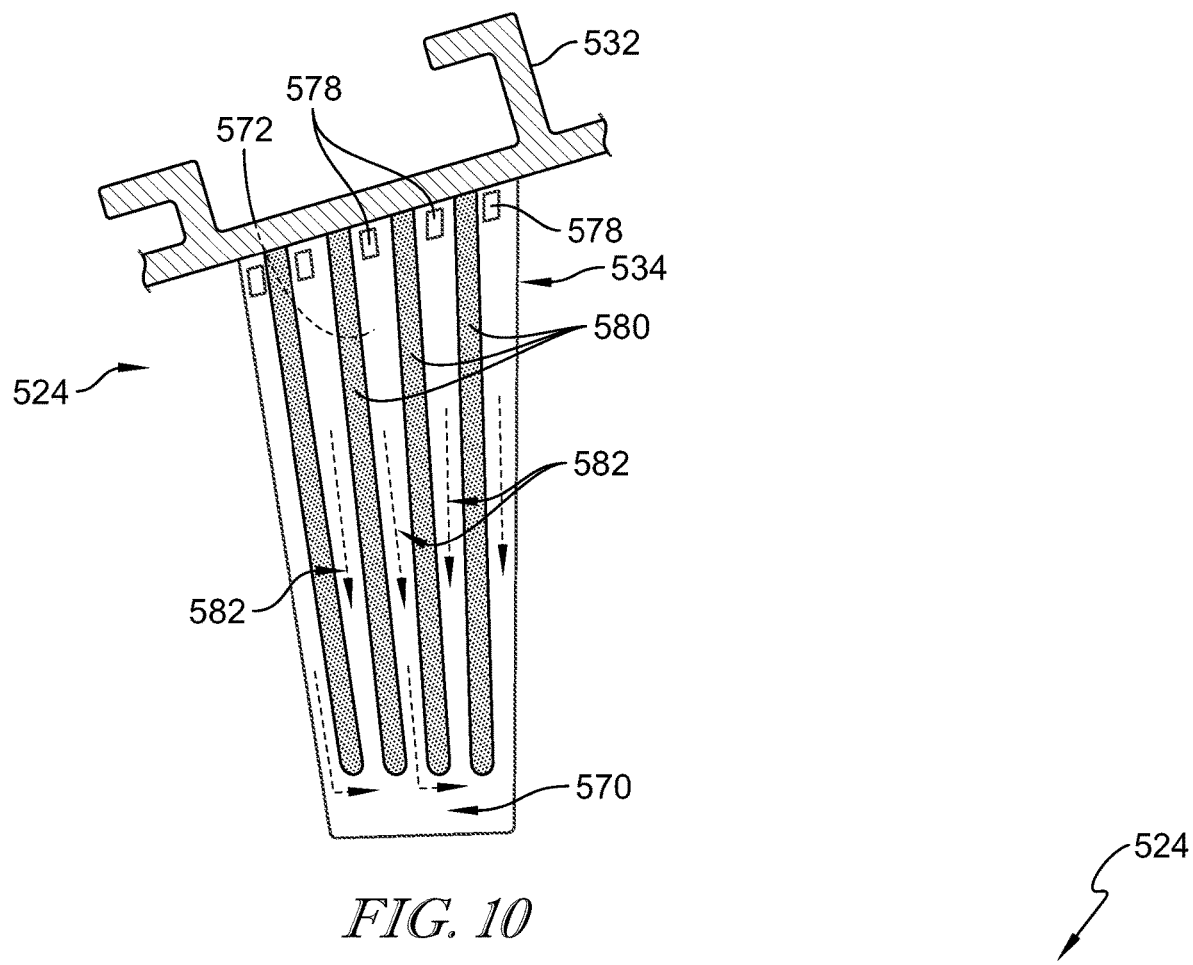
FIG. 10 is a detailed view another embodiment of a spar adapted for use in the turbine vane assembly of FIG. 2 showing the spar having a plurality of ribs that extend radially along the radial length of the spar and cooperate with cooling holes located near the outer band that encourage cooling air to follow radially inward toward the inner platform through the cooling passages created by the ribs.
Figure 11:
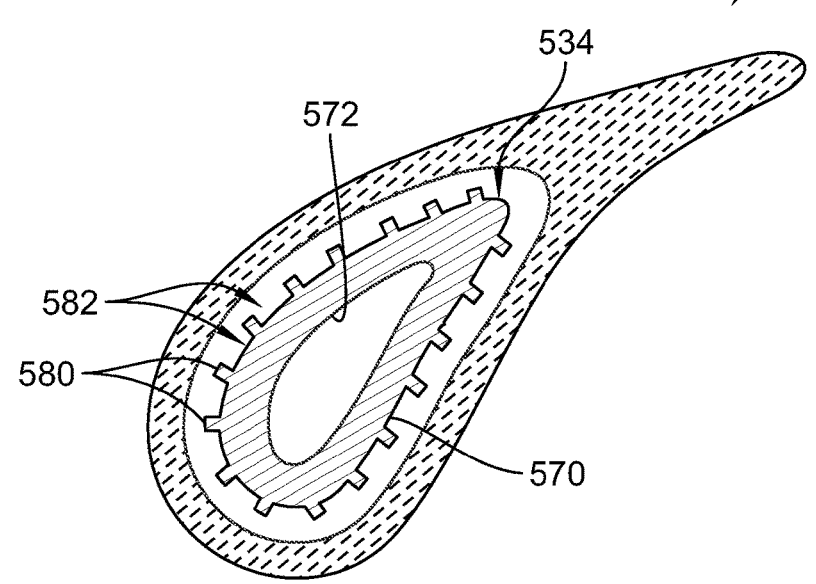
FIG. 11 is a cross-section view of a turbine vane assembly with the spar of FIG. 10 showing the radially extending ribs that extend outward from the spar partially into the cooling cavity.

Another embodiment of a spar 534 in accordance with the present disclosure is shown in FIGS. 10 and 11. The spar 534 is substantially similar to the spar 34 shown in FIGS. 1-5 and described herein. Accordingly, similar reference numbers in the 500 series indicate features that are common between the spar 534 and the spar 34. The description of the spar 34 is incorporated by reference to apply to the spar 534, except in instances when it conflicts with the specific description and the drawings of the spar 534.

In this embodiment, the spar 534 includes an arrangement of the cooling ribs 580 that extend radially, along a spar outer surface 570 as shown in FIGS. 10 and 11. Cooling holes 578 are positioned between adjacent cooling ribs 580 and located radially outward close to an outer band 532. The cooling holes 578 extend from the spar inner surface 572 to the spar outer surface 570 in the illustrative embodiment. The resulting radial cooling channels 582 direct cooling air from an outer portion of the spar 534 of the turbine vane assembly 524 to the inner portion of the spar 534 of the turbine vane assembly 524 wherein the cooling air is ejected through at least one inner platform exhaust passage 88.

Figure 12:
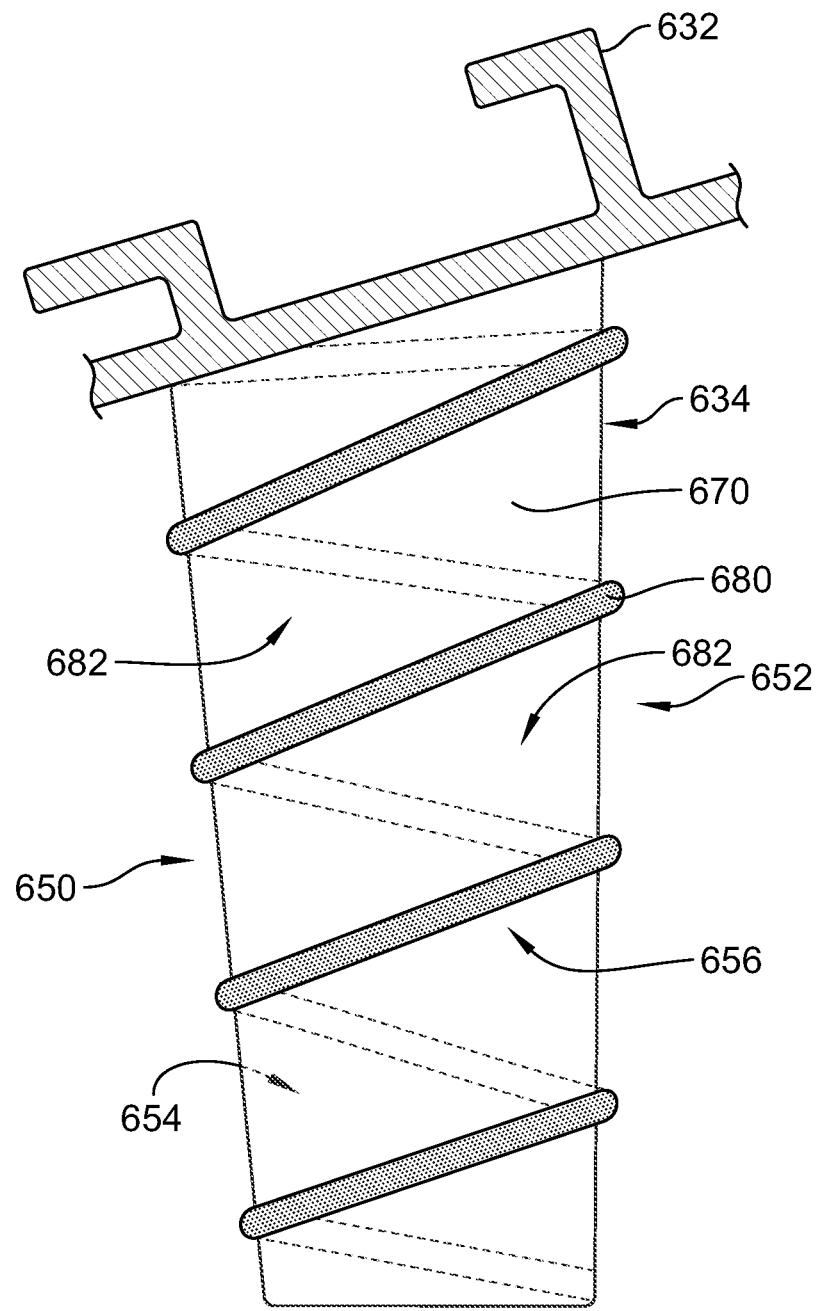
FIG. 12 is a detailed view of another embodiment of a spar adapted for use in the turbine vane assembly of FIG. 2 showing the spar having a rib in a spiral configuration around the outer wall of the spar so that the rib extends around the leading edge, the pressure side, the trailing edge, and the suction side of the spar while simultaneously extending radially from the inner platform toward the outer platform.

Another embodiment of a spar 634 in accordance with the present disclosure is shown in FIG. 12. The spar 634 is substantially similar to the spar 34 shown in FIGS. 1-5 and described herein. Accordingly, similar reference numbers in the 600 series indicate features that are common between the spar 634 and the spar 34. The description of the spar 34 is incorporated by reference to apply to the spar 634, except in instances when it conflicts with the specific description and the drawings of the spar 634.

In the illustrative embodiment, the spar 634 includes a cooling rib 680 which is similar to the cooling rib 80, but has a spiral configuration around a spar outer surface 670. In the spiral configuration, the cooling rib 680 extends around a leading edge 650, a pressure side 656, a trailing edge 652, and a suction side 654 of the spar outer surface 67, while simultaneously extending radially from the inner portion of the spar 634 towards an outer band 632 as shown in FIG. 12.

In the illustrative embodiment, the cooling rib 680 forms a continuous cooling channel 682. The continuous cooling channel 682 follows the circumference of the spar outer surface 670 and the full radial height of the spar 634.

Figure 13:
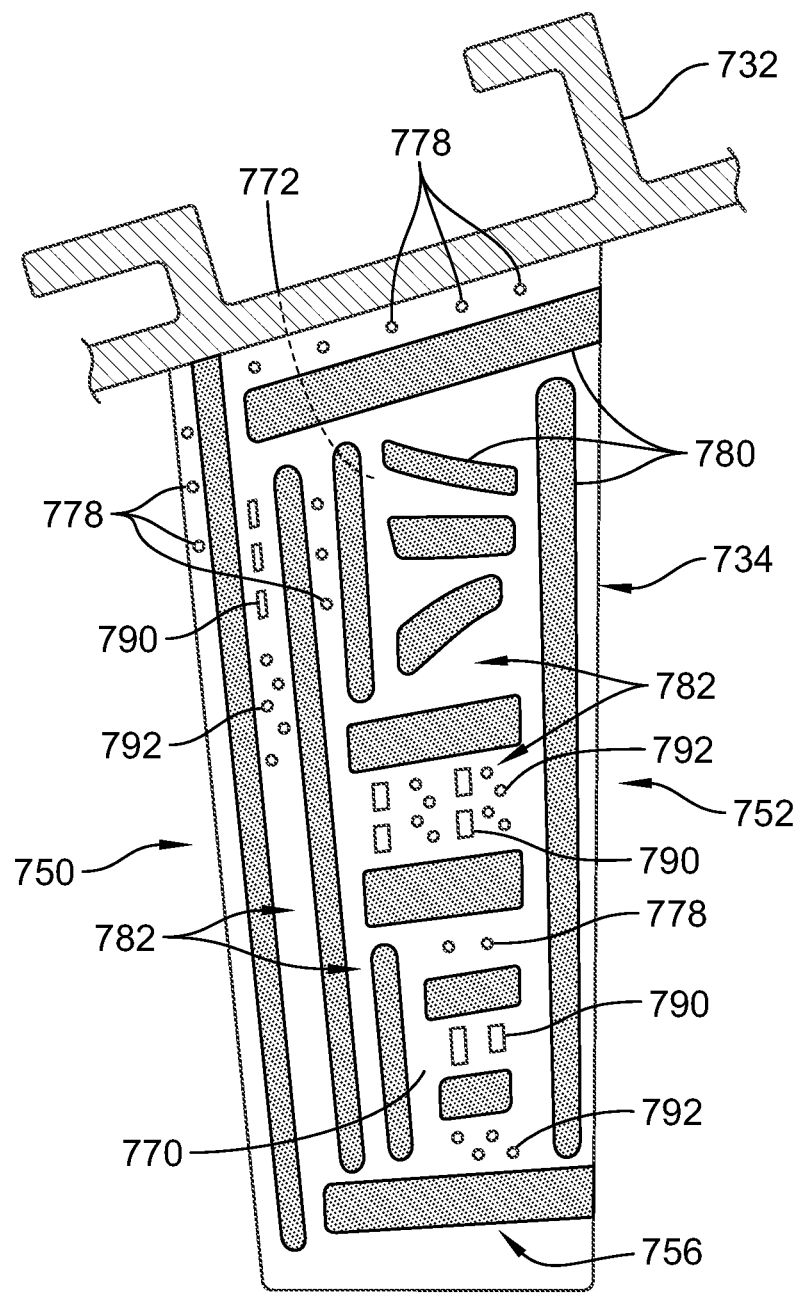
FIG. 13 is a detailed view of another embodiment of a spar adapted for use in the turbine vane assembly of FIG. 2 showing the spar having a combination of a variety of ribs and feed holes in accordance with the present disclosure.

Another embodiment of a spar 734 in accordance with the present disclosure is shown in FIG. 13. The spar 734 is substantially similar to the spar 34 shown in FIGS. 1-5 and described herein. Accordingly, similar reference numbers in the 700 series indicate features that are common between the spar 734 and the spar 34. The description of the spar 34 is incorporated by reference to apply to the spar 734, except in instances when it conflicts with the specific description and the drawings of the spar 734.

In this embodiment, the spar 734 includes an arrangement of the cooling ribs 780 that extend both radially, axially, and/or that create converging cooling channels 782 along a spar outer surface 770 as shown in FIG. 13. Cooling ribs 780 can extend radially between axially extending cooling ribs, and/or extend axially between radially extending cooling ribs. Each cooling channel 782 may contain turbulators 790 and/or discrete fins 792, or neither turbulators 790 or discrete fins 792. Cooling holes 778 are positioned between adjacent cooling ribs 780 and can be located radially outward close to an outer band 732, spaced radially along a leading edge 750, or partway along a pressure side 756 between the leading edge 750 and a trailing edge 752 of the spar 734. The cooling holes 778 extend from the spar inner surface 772 to the spar outer surface 770 in the illustrative embodiment.

In some embodiments, the profile tolerance of the ceramic matrix composite airfoil 44 may be inadequate for sealing functionality if no clash or bedding-in is permitted. Likewise, the coefficient of thermal expansion of the cooling ribs 80 (if metallic) are likely to be significantly larger than the ceramic matrix composite airfoil 44, therefore a cold build clearance may be desired to avoid over-stressing the ceramic matrix composite airfoil 44.

Additionally, to improve the performance of the cooling ribs 80, the cooling ribs 80 may be adaptively machined into the spar 34. In other embodiments, the cooling ribs 80 may be additive layer manufactured. The forming of the cooling ribs 80 may be selected based on an inspection of a given ceramic matrix composite airfoil 44 parts internal walls. Different configuration options for achieving this effect are detailed in the following paragraphs.

In some embodiments, a crosswise flow may be used wherein cooling air enters the cooling passage cavity 76 from the feed duct 74 via leading edge cooling holes 78 as shown in shown in FIG. 4. Leading edge cooling holes 78 may be located toward the leading edge 50 of the ceramic matrix composite airfoil 44 and flow direction axially aft. Cooling ribs 80 guide the direction of flow and assist in management of heat transfer levels.

In other embodiments, the cooling ribs 380 are shaped to converge as flow is controlled rearward as shown in FIG. 7. The converging cooling ribs 380 may increase the range of the size of the initial region cooled toward the leading edge 350.

In other embodiments, additional cooling features, turbulators 490, or discrete fins 492, may be added between the cooling ribs 480. The purpose of turbulators 490 and/or discrete fins 492 may be to enhance the heat transfer effect of the cooling flow. Examples for pin fins 492 and/or turbulators 490 are shown in FIG. 8. Alternative options may be available for doing this function.

In other embodiments, supplemental cooling holes 284 may be included in the spar 234. The cooling air may be provided from the feed duct part way along the length of the cooling channels 282 formed by cooling ribs 280 as shown in FIG. 6.

In other embodiments, cooling flow may be controlled in radial direction as shown in FIG. 10. An exit slot may be a single larger slot/hole to receive all air or it may alternatively be multiple holes spaced around the perimeter of the cooling cavity at the inner end similar to the inner platform exhaust passages shown in FIG. 5.

In other embodiments, the radial cooling ribs 480 may be combined with the turbulators 490 and/or discrete fins 492 to increase heat transfer as shown in FIG. 10. Additionally, further supplemental cooling holes may be employed with/without the turbulators 490 and/or discrete fins 492.

In some embodiments, the cooling air exit hole 47 may be located in the ceramic matrix composite airfoil 44. In other embodiments, the cooling air may be exhausted into the inner seal cavity 89. This flow then contributes to the cavity sealing flow reducing further the net flow.

In some embodiments, the spar includes a single feed duct 74 inside the metallic spar 34 that provides cooling flows to the cooling passage cavity 76 of the turbine vane assembly 24. The feed duct 74 may also transit flow through the metallic spar 34. Additionally, two cooling flow inlet holes 64, 66 may be used to control the pressure within two cavities 86, 87 in the feed duct 74 independently.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane assembly adapted for use with a gas turbine engine, the turbine vane assembly comprising
    an airfoil comprising ceramic matrix composite materials and adapted to interact with hot gases flowing around the turbine vane assembly during use of the turbine vane assembly, the airfoil having an outer surface and an inner surface located opposite the outer surface to define an airfoil-shaped cavity that extends radially entirely through the airfoil relative to an axis,
    a spar comprising metallic materials and located in the airfoil-shaped cavity to receive force loads applied to the airfoil by the hot gases during use of the turbine vane assembly, the spar and the inner surface of the airfoil cooperate to define a cooling passage that extends around the spar, and the spar formed to define a feed duct that extends radially into the spar and a feed hole that extends through the spar and fluidly connects the feed duct with the cooling passage to allow cooling gas to flow from the feed duct into the cooling passage to cool the airfoil, and
    a plurality of ribs that extend outward from the spar partway into the cooling passage toward the inner surface of the airfoil and define cooling channels between the plurality of ribs to distribute a flow of the cooling gas and control local heat transfer between the cooling gas and the airfoil,
    wherein the plurality of ribs are the only ribs of the turbine vane assembly that extend into the cooling passage and the plurality of ribs extend only partway into the cooling passage toward the inner surface of the airfoil, and
    wherein the cooling passage has a depth defined between the spar and the inner surface of the airfoil and the plurality of ribs extend from the spar by a distance of between 50 percent and 95 percent of the depth of the cooling passage.

2. The turbine vane assembly of claim 1, wherein the spar has a leading edge and a trailing edge spaced apart axially from the leading edge relative to the axis and the plurality of ribs extend axially and radially such that the cooling channels converge as they extend axially from the leading edge toward the trailing edge.

3. The turbine vane assembly of claim 1, wherein the plurality of ribs form a spiral shape that wraps around the spar from a radial outer end of the spar toward a radial inner end of the spar.

4. The turbine vane assembly of claim 1, wherein each of the plurality of ribs extends substantially axially relative to the axis.

5. The turbine vane assembly of claim 1, wherein each of the plurality of ribs extends substantially radially relative to the axis.

6. The turbine vane assembly of claim 1, further comprising turbulators located in the cooling channels, the turbulators including discrete fins that extend from the spar partway into the cooling passage.

7. The turbine vane assembly of claim 6, wherein the plurality of ribs extend away from the spar by a first thickness, the turbulators extend away from the spar by a second thickness, and the first thickness is greater than the second thickness.

8. The turbine vane assembly of claim 1, wherein the spar has a leading edge and a trailing edge spaced apart axially from the leading edge relative to the axis, the feed hole extends through the leading edge of the spar, and the spar is formed to define a supplemental hole that extends through the spar and is located centrally along an axial direction of the cooling channels between the leading edge and the trailing edge and opens into one of the cooling channels.

9. The turbine vane assembly of claim 1, wherein at least two ribs of the plurality of ribs extend substantially axially relative to the axis and at least two further ribs of the plurality of ribs extend substantially radially relative to the axis.

10. The turbine vane assembly of claim 9, further comprising turbulators located in at least one cooling channel defined between the at least two ribs that extend substantially axially, and turbulators located in at least one cooling passage defined between the at least two ribs that extend substantially radially.

11. A turbine vane assembly adapted for use with a gas turbine engine, the turbine vane assembly comprising
an airfoil comprising ceramic matrix composite materials and formed to define a cavity that extends into the airfoil, the airfoil having a leading edge and a trailing edge spaced apart axially from the leading edge,
a spar comprising metallic materials and located in the cavity to define a cooling passage that extends around the spar, and the spar formed to define a feed duct that extends through the spar in a first direction and a feed hole that extends through the spar in a second direction and fluidly connects the feed duct with the cooling passage, the spar having a leading edge and a trailing edge spaced apart axially from the leading edge, the feed hole extending through the leading edge of the spar,
an outer platform and an inner platform that are coupled with the airfoil, the inner platform is spaced apart radially from the outer platform, and the inner platform is formed to define an exhaust passage that extends radially through the inner platform to fluidly connect the cooling passage and an inner seal chamber located radially inward of the inner platform, and
a plurality of ribs that extend outwardly from one of the spar and the airfoil partway into the cooling passage toward the other of the spar and the airfoil, the plurality of ribs cooperate to define cooling channels therebetween,
wherein the airfoil includes an exit hole that extends through the trailing edge of the airfoil and opens into the cooling channel, and a cooling gas flows from the feed hole into the cooling channel and from the cooling channel into the exit hole in order to cool the airfoil.

12. The turbine vane assembly of claim 11, wherein the spar is formed to define a supplemental hole that extends through the spar and is located centrally along an axial direction of the cooling channel between the leading edge and the trailing edge and opens into the cooling passage.

13. The turbine vane assembly of claim 11, wherein the plurality of ribs are arranged such that inlets of the cooling channels located toward the leading edge are larger than exits of the cooling channels located toward the trailing edge.

14. The turbine vane assembly of claim 11, further comprising turbulators located in the cooling passage, the plurality of ribs extend away from the spar by a first thickness, the turbulators extend away from the spar by a second thickness, and the first thickness is greater than the second thickness.

15. The turbine vane assembly of claim 11, wherein the plurality of ribs form a spiral shape that wraps around the spar from a radial outer end of the spar toward a radial inner end of the spar.

16. The turbine vane assembly of claim 11, wherein the spar is formed to define a dam that extends radially through the feed duct to separate the feed duct into a first plenum and a second plenum, the feed hole fluidly connects the first plenum and the cooling passage, and the only inlet and exit into and out of the second plenum are through radial ends of the spar such that the second plenum is not in fluid communication with the cooling passage.

17. A method comprising
providing a metallic spar and a ceramic matrix composite airfoil, the ceramic matrix composite airfoil having an outer surface and an inner surface that defines an airfoil-shaped cavity that extends through the ceramic matrix composite airfoil,
measuring the ceramic matrix composite airfoil to obtain dimension measurements of the inner surface of the ceramic matrix composite airfoil,
forming a plurality of ribs on the spar that extend outwardly away from the spar based on the dimension measurements, and
locating the spar and the plurality of ribs in the airfoil-shaped cavity such that each of the plurality of ribs is spaced apart from the inner surface of the ceramic matrix composite airfoil,
wherein the plurality of ribs are the only ribs of the spar and of the ceramic matrix composite airfoil that extend outwardly and the plurality of ribs extend only partway toward the inner surface of the ceramic matrix composite airfoil, and
the spar and the inner surface of the ceramic matrix composite airfoil and the plurality of ribs extend from the spar by a distance of between 50 percent and 95 percent of the first distance.

18. The method of claim 17, wherein the step of forming the plurality of ribs includes using additive layer manufacturing to build up layers of metal on the spar.

* * * * *